United States Patent [19]

Asari et al.

[11] 4,014,443

[45] Mar. 29, 1977

[54] DELIVERY DEVICE FOR HEATING FURNACES

[75] Inventors: Akira Asari, Osaka; Takashige Yamamura; Kenzou Tatsuno, both of Kobe, all of Japan

[73] Assignee: Kobe Steel Ltd., Kobe, Japan

[22] Filed: Aug. 13, 1975

[21] Appl. No.: 604,122

[52] U.S. Cl. .............................. 214/27; 214/1 BB; 432/124; 432/239

[51] Int. Cl.[2] .............................. B65G 25/04

[58] Field of Search .................... 214/27, 28, 1 BB; 432/124, 128, 239, 56

[56] References Cited

UNITED STATES PATENTS

| | | | |
|---|---|---|---|
| 1,783,156 | 11/1930 | Talley | 432/56 X |
| 2,622,861 | 12/1952 | Talley | 432/239 X |
| 3,184,031 | 5/1965 | Dunlap | 214/1 BB |
| 3,295,701 | 1/1967 | Alexander | 214/1 BB |
| 3,397,799 | 8/1968 | Wallis | 214/1 BB |

*Primary Examiner*—Stephen G. Kunin
*Assistant Examiner*—Sherman D. Basinger
*Attorney, Agent, or Firm*—Oblon, Fisher, Spivak, McClelland & Maier

[57] ABSTRACT

A delivery device for delivering articles to be heated within a compound furnace, including at least two furnace chambers differing in heating conditions and which can effectively prevent damage to the articles by melt adhesion due to contact with each other and which can also reduce the adverse influence of high temperatures upon the component members of the delivery device is disclosed as including clamps which are capable of reciprocating within a delivery passage and which have the function of clamping and unclamping the articles to be heated so as to deliver or transport the same. Running rods, upon which the clamps are fixed, are adapted to move along the delivery passage and a main drive source for driving the rods and clamps, as well as a subsidiary drive source for performing the clamping and unclamping operations of the clamps are also provided. A movement converting transmission mechanism for converting the linear driving force of the subsidiary drive source into a rotary drive force for rotating the running rods in order to actuate the clamps for performance of the clamping and unclamping operations is included and a clamp positioning mechanism for determining the stopping position of the clamps is operatively associated with the running rods. The movement converting transmission mechanism may include a rack-and-pinion mechanism, a slide bar or rod-crank mechanism, an actuator-gear mechanism, or a cylindrical cam mechanism.

11 Claims, 11 Drawing Figures

DELIVERY DEVICE FOR HEATING FURNACES

BACKGROUND OF THE INVENTION

1. Field of the Invention

The present invention relates generally to delivery or transport mechanisms, and more particularly to a delivery device which is capable of delivering articles to be heated within a compound furnace, including at least two furnace chambers differing in heating conditions, wherein the articles are transported from one chamber to another chamber.

2. Description of the Prior Art

With respect to the methods for successively delivering articles to be heated within a heating furnace, there have heretofore generally been adopted a pusher method in accordance with which articles to be heated are successively pushed into a furnace from the rear by means of a pusher cylinder; a pinch roller method in accordance with which the articles to be heated are delivered in a forward direction by pairs of oppositely rotating rollers disposed upon the upper and lower sides, or upon the left and right sides, of the delivery track; a roller method in accordance with which the articles to be heated are delivered by a plurality of rollers, disposed upon the lower face of a furnace and rotating in the same direction; a walking beam method in accordance with which a beam capable of moving in both the vertical and horizontal directions is disposed so as to penetrate a furnace from the inlet to the outlet thereof, the beam traversing a rectangular path of movement by initially raising the articles to be heated on the hearth, forwarding the articles by a single pitch or step, lowering the articles upon the hearth at a point forward of the original position by one pitch or step, and returning through the one pitch or step at a level below the hearth; as well as other similar methods.

The pusher method, as a method of delivering articles to be heated within a heating furnace, is defective as the articles to be heated are delivered in a state wherein they are in contact with each other whereby melt adhesion is caused within a high temperature zone. The pinch roller method or roller method are suitable for the delivery of long articles, but are not suitable for the delivery of a large number of small articles of diameters and lengths which do not vary appreciably. The walking beam method is defective in that when the furnace length is long, the delivery within the furnace cannot be assuredly accomplished.

As is seen from the foregoing, each of the conventional methods is defective in some point or another, and by the adoption of a rotary hearth method, it has been possible for the first time to assuredly perform the delivery of the articles to be heated while preventing the articles from coming into contact with each other, and in addition, to assure the precise and stable delivery even when the articles are asymmetric and the deviation of the direction at the furnace outlet, that is, rotation of the articles within the furnace, is not permitted.

In the case of a compound furnace having at least two chambers of different heating conditions, and wherein such rotary hearth furnace is used, such as for example, a high temperature furnace, and is combined with another low temperature furnace for cooling or soaking, when a delivery device to be used exclusively for transporting the articles to be heated from one furnace to the other is assembled in conjunction with this compound furnace, since the furnace temperature is very high, the influence of the high furnace temperature upon the moving parts of the delivery device and the articles to be heated must be taken into consideration.

Adoption of the above-mentioned pusher method as such an exclusive delivery means within the above-mentioned compound furnace has been proposed, however, when the articles to be heated are arranged in a plurality of rows upon the rotary hearth furnace, it is difficult to individually pick up the articles arranged in parallel rows, and when the articles to be heated are relatively small, the articles readily drop into the clearance between the hearth floor of the rotary hearth furnace and the floor of the delivery passage whereby the delivery operation becomes unstable. In addition, as the articles to be heated are directly pushed into the furnace, the pushing force acts upon the articles as a lateral pressure, which adversely affects the articles by causing other undesired phenomena, such as for example, slipping of the articles upon the hearth, to occur.

As a means for overcoming such adverse affects caused by this direct pushing and the resulting slipping, there has also been proposed a method in accordance with which the articles to be heated are received upon a tray. When such a tray is employed however, an additional operation is necessary for charging the articles onto the tray and for removing them therefrom. Accordingly, the apparatus is inevitably complex and the operation becomes intricate.

SUMMARY OF THE INVENTION

Accordingly, a primary object of the present invention is to provide delivery apparatus which will solve the above-mentioned problems characteristic of the conventional techniques.

Another object of the present invention is to provide a delivery device within a heating furnace within which the articles being transported from one furnace chamber to another furnace chamber within a high temperature atmosphere, as well as the device per se, will not be adversely affected by the temperatures of the furnace, and even when the articles to be heated are arranged in a plurality of rows, the articles can be assuredly clamped and delivered, in an individual or separate manner, to the next furnace chamber and similarly, assuredly be unclamped therein.

In order to attain the foregoing objects, the present invention embodies a device, for delivering articles to be heated within a furnace and to be delivered from one furnace chamber to another furnace chamber, which includes clamping mechanisms having the function of clamping and unclamping the articles to be heated and being capable of reciprocating within a delivery passage connecting both furnace chambers. Two different drive sources are disposed exteriorly of the furnace chambers for performing the operations of linearly moving the clamping mechanisms and of closing or opening the same for clamping or unclamping the articles to be heated, cylinders or actuators being used as such drive sources. The delivery device of this invention further comprises a movement converting transmission mechanism for converting the linear driving force of the drive source for closing or opening the clamping mechanisms into a rotary movement thereof, and this transmission mechanism has a very simple structure and assures accurate operations, the mechanism being, for example, a rack-and-pinion type mechanism, a slide bar-crank mechanism, an actuator-gear mechanism, or a cylindrical cam mechanism. The delivery device of the present invention also includes a clamp positioning mechanism including a spacer, a spacer-driving cylinder, and a stopper so disposed as to deliver the articles to be heated from one prescribed position to another prescribed position.

In order to eliminate or reduce the adverse effects of the high furnace temperatures upon the delivery device of the present invention, the delivery passage is cooled from or with respect to the surroundings thereof, and the running rods are formed so as to be hollow structures whereby the same may be cooled by means of a cooling medium flowing through the hollow portions. The running rods also travel in an inclined manner and with a predetermined angle of inclination with respect to the hearth floor and the floor of the delivery passage so that the articles to be heated are not in contact with these floors while they are being delivered, whereby damage to such articles is further prevented.

BRIEF DESCRIPTION OF THE DRAWINGS

Various other objects, features and attendant advantages of the present invention will be more fully appreciated as the same becomes better understood from the following detailed description when considered in connection with the accompanying drawings, in which like reference characters designate like or corresponding parts throughout the several views and wherein.

DETAILED DESCRIPTION OF THE PREFERRED EMBODIMENTS

The present invention will now be described in detail by reference to embodiments illustrated within the accompanying drawings, however, it is to be noted that the present invention is not limited to the production of the powder-forged products specifically illustrated within the drawings, and that the heating furnace of the invention is not limited to the compound furnace illustrated within the drawings which comprises a rotary hearth furnace and a furnace, for cooling or soaking, provided separately from the rotary hearth furnace, but to the contrary, the present invention is applicable to the delivery of articles to be heated within any compound heating furnace which may include a furnace chamber and one or more additional heating furnace chambers which differ from the first furnace chamber with respect to the heating conditions therein.

Figure 1:
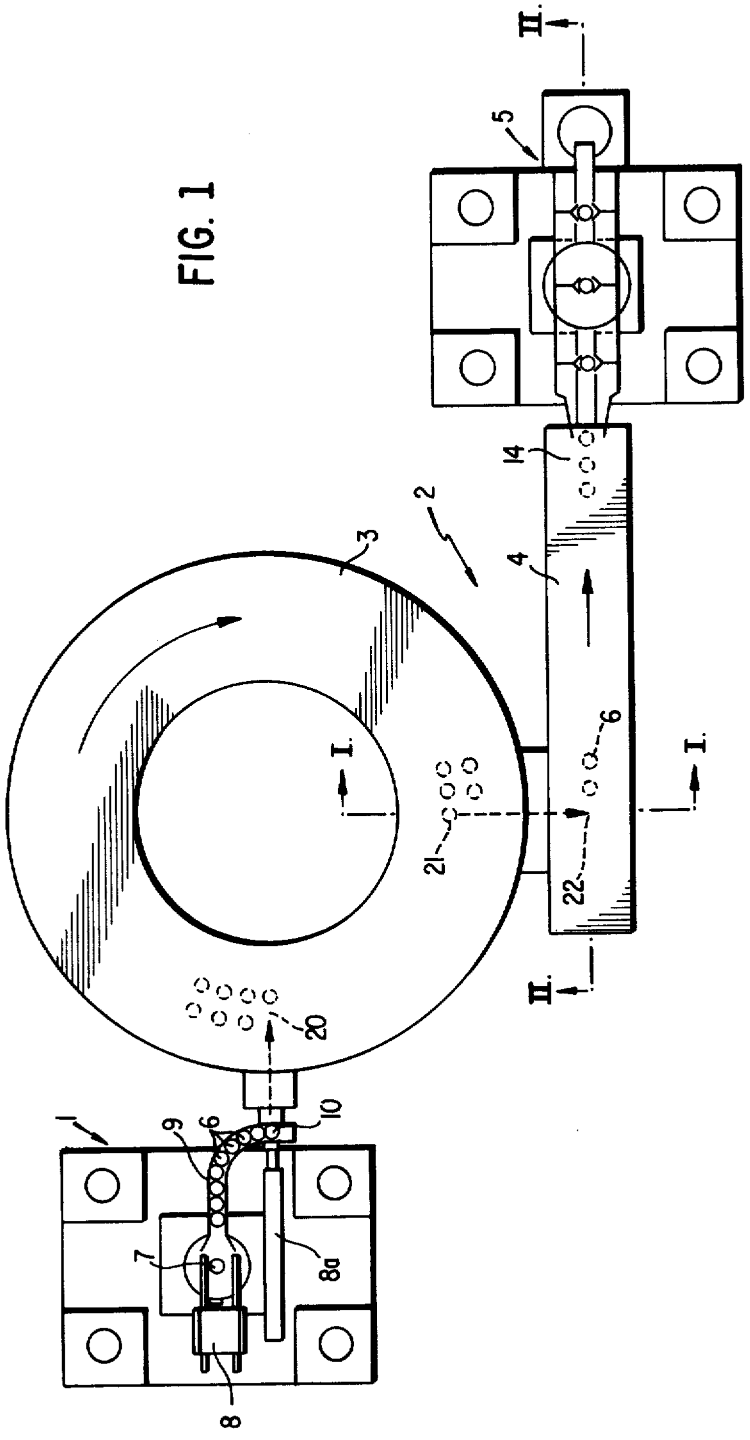
FIG. 1 is a plan view of apparatus utilized for preparing powderforged products including the delivery device of the present invention.

Referring now to the drawings, and more particularly to FIG. 1 thereof, a powder molding press, generally indicated by the reference character 1, is disposed adjacent to a heating furnace generally indicated by the reference character 2. The furnace 2 is a compound furnace which includes a rotary hearth furnace 3, constituting a high temperature zone, such as, for example, above 1100° C, and a cooling or soaking furnace 4 constituting a low temperature zone, such as for example, 800°– 1000° C, and the heating furnace 2 may further include one or more furnace chambers. A forging press 5 is disposed adjacent to the cooling furnace 4 and it is also seen that the powder molding press 1 is disposed so as to confront the rotary hearth furnace 3 which rotates in the clockwise direction as seen in FIG. 1, premolded articles 6, formed by the press 1, being readily delivered into the furnace 3. The cooling or soaking furnace 4 is disposed substantially tangential to the rotary hearth furnace 3 and the forging press 5 is disposed at the terminal end of the cooling or soaking furnace 4. The powder molding press 1 is provided with a device 8 for feeding raw materials to the molding station 7 of the molding press 1 and for discharging the formed premolded articles 6 therefrom, the premolded articles 6 being guided to a supply station 10 by means of an arcuate chute 9.

The premolded articles 6 are shown being charged into the furnace 3 in two rows from the supply station 10 by means of a ram or pusher 8a having a head located within the supply station 10, the stroke of the ram being controlled by means of a stopper, not shown, however, the premolded articles 6 may also be fed so that they are arranged in a single row or in three or more rows. In either mode, the premolded articles 6 are charged into the rotary hearth furnace 3 so that they are not in contact with each other, that is, spaces are formed between every two adjacent premolded articles 6. The premolded articles 6 charged into the rotary hearth furnace 3 in this manner are subsequently heated to a temperature exceeding 1100° C, within a reducing or neutral atmosphere sealed from air, and in this manner, they are assuredly transferred from a receiving station 20 of hearth 3 to the discharge station 21 of hearth 3 by means of rotational movement of the rotary hearth of the rotary hearth furnace 3. Since the premolded articles 6 are prevented from being in contact with each other during this delivery process, melt adhesion of the premolded articles 6 can be completely prevented, even at a temperature greater than 1100° C, within the reducing or neutral gas atmosphere.

The premolded articles 6 which have been delivered to the discharge station 21 of the hearth 3, in the state wherein melt adhesion as a result of contact between the premolded articles 6, and also positional deviation or rotation of the premolded articles 6, is prevented, are then cooled or soaked to a forging temperature within the range of 800°– 1000° C so that the service life of the forging die of the forging press 5 to be used during the subsequent process steps can be prolonged as much as possible, and for this purpose, the cooling or soaking furnace 4 is so provided.

The present invention relates to a device for delivering the premolded articles or the articles to be heated from the discharge station 21 of the hearth 3 to the receiving station 22 of the cooling or soaking furnace 4, and the device is illustrated in detail within FIGS. 2 – 11.

Figure 2:
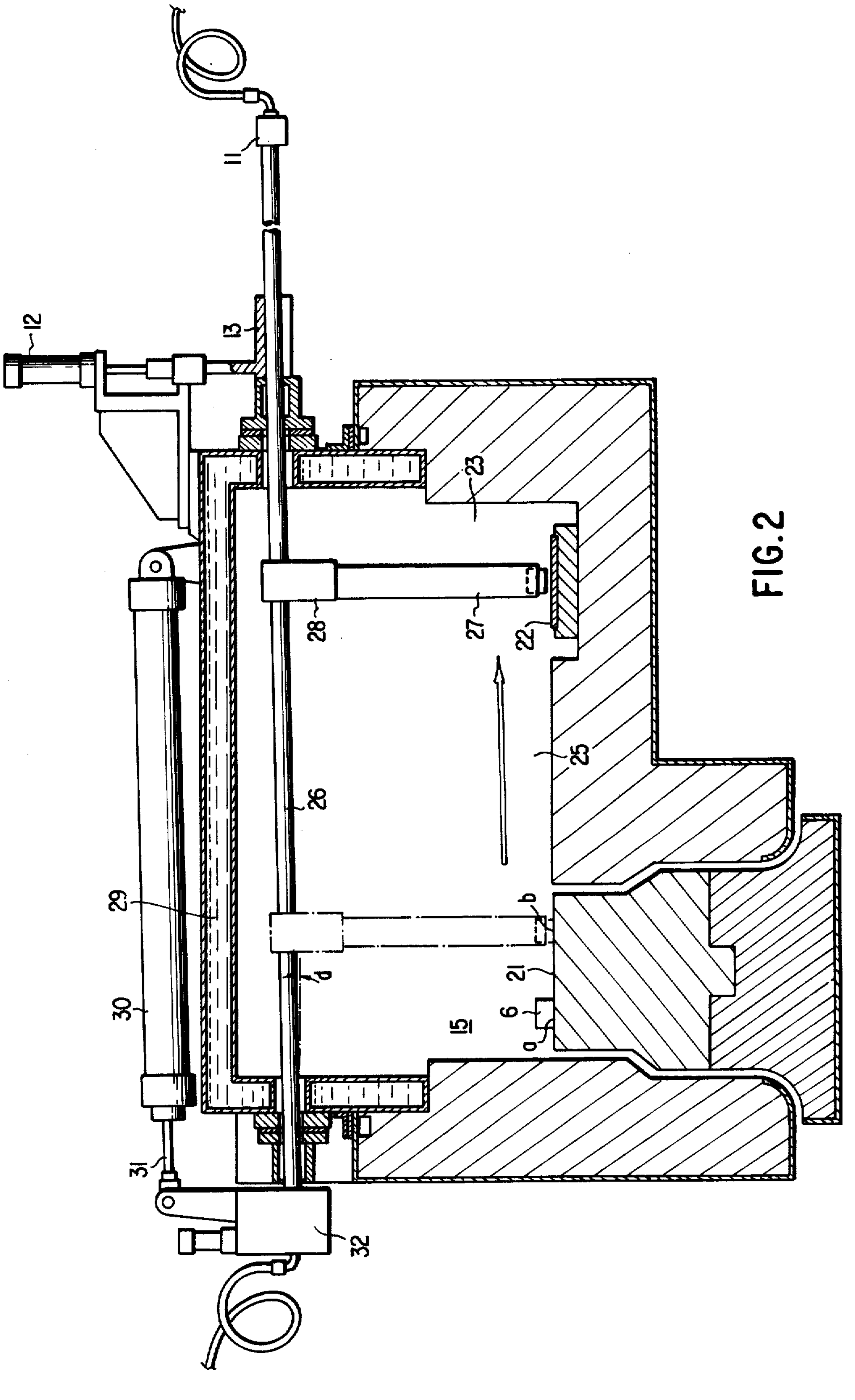
FIG. 2 is a cross-sectional view of the apparatus of FIG. 1 taken along the line I—I in FIG. 1, and which illustrates a delivery device constructed in accordance with the present invention and showing its cooperative parts.
Figure 3:
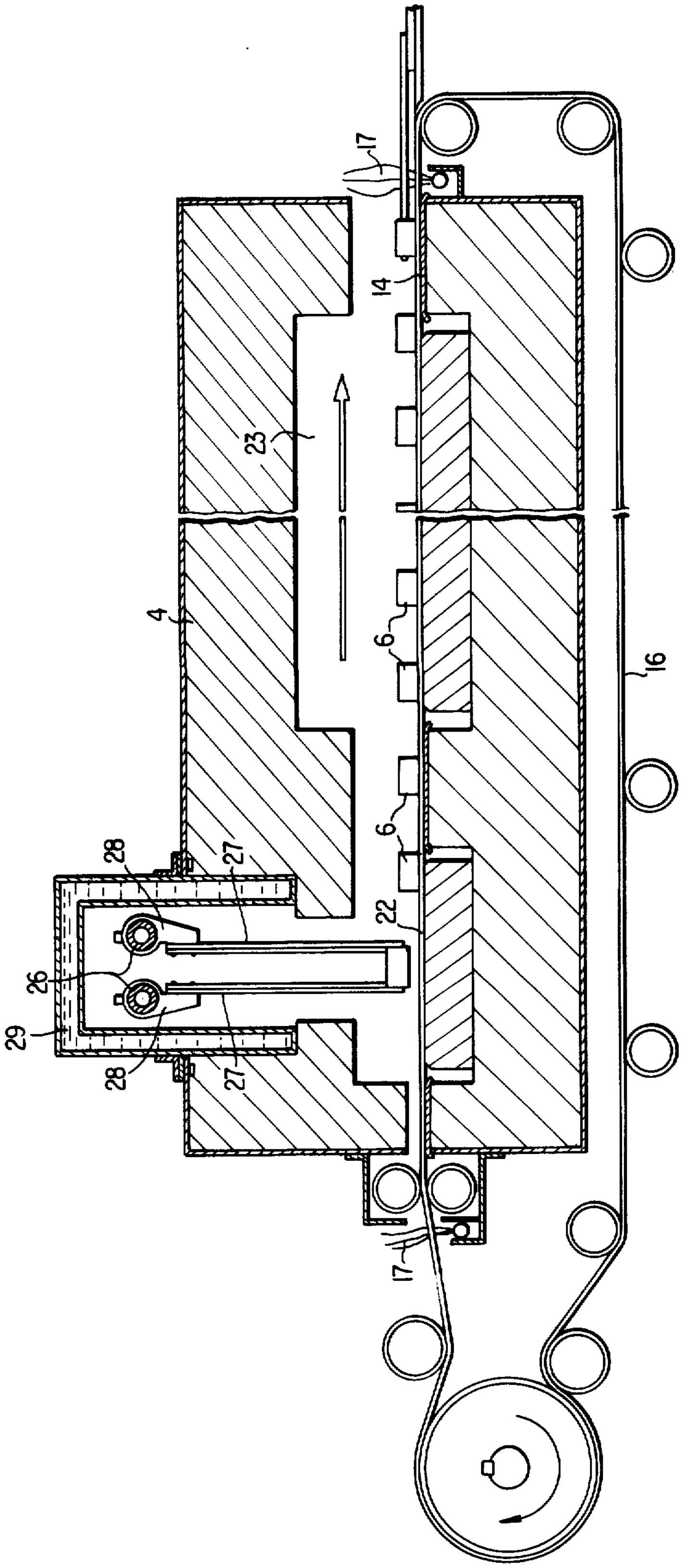
FIG. 3 is a cross-sectional view of the apparatus of FIG. 1 taken along the line II—II in FIG. 1.

As shown within FIGS. 2 and 3, a delivery passage 25 for the premolded articles 6 is provided for connecting and communicating a heating furnace chamber 15 and a cooling or soaking furnace chamber 23 with each other. The delivery direction within the delivery passage 25 crosses or traverses the delivery direction within at least one of the furnace chambers 15 and 23, and above the delivery passage 25, two running rods 26 are disposed within passage 25 so as to extend parallel to the delivery direction within delivery passage 25, rotors 28, having a pair of clamps 27 fixed thereto in the suspended state, being fixed to the running rods 26. Prescribed portions of the running rods 26, as well as the clamps 27 and rotors 28, can reciprocate within the delivery passage 25, as illustrated hereinafter, and since these members 27 are disposed so as to clamp the premolded article 6 to be heated at the station 21, to deliver them to the station 22, and to unclamp the same at the station 22, they should have the ability to perform these functions continuously and repeatedly while withstanding atmospheric temperatures approximating 1000° C. Accordingly, a refractory material must be used as the material constituting these members, however, when a non-metallic refractory material is used, the operation is unstable, and hence, a metallic material is used as the material for these members.

However, even a heat-resistant metal cannot sufficiently withstand the aforenoted atmospheric temperatures, and consequently, only indispensable parts of the running rods, rotors and clamps are disposed within the delivery passage 25, the drive sources, and clamp opening and closing mechanisms, for causing these members to perform the prescribed functions, being disposed exteriorly of the furnace chambers, inclusive of the delivery passage 25, whereby the influence, of the high temperatures within the delivery zone, upon the aforenoted moving members, is reduced to a minimum level.

A cooling member 29 is disposed so as to cover and surround the delivery passage 25, including the above-mentioned essential parts of the system contained therein, and air, oil, water or the like is circulated as a cooling medium within the cooling member 29. The effect of cooling the moving members or parts can be greatly enhanced when hollow rods are utilized as the running rods 26 and a cooling medium, such as those mentioned above, is passed through the hollow portions of the running rods 26.

Figure 10:
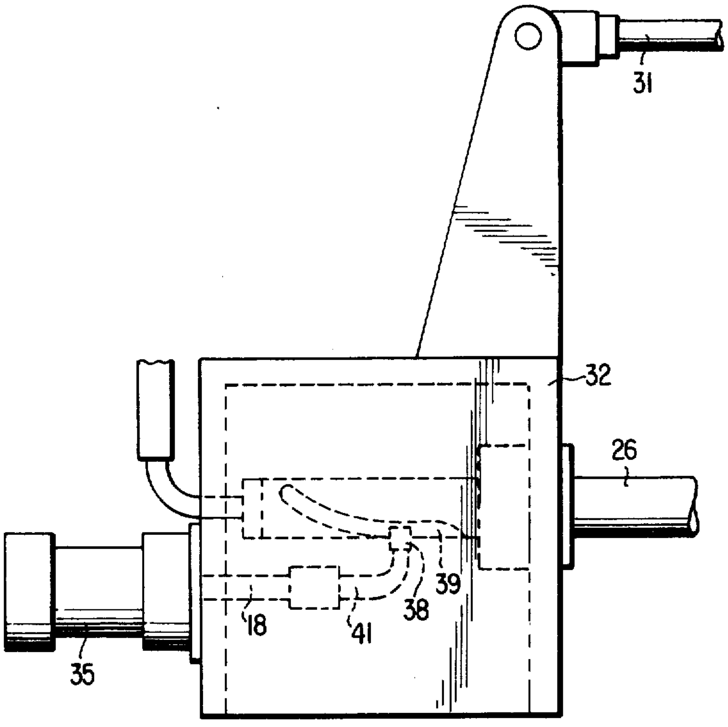
FIG. 10 is a side view of a cylindrical cam mechanism for opening and closing the clamps of the present invention.
Figure 11:
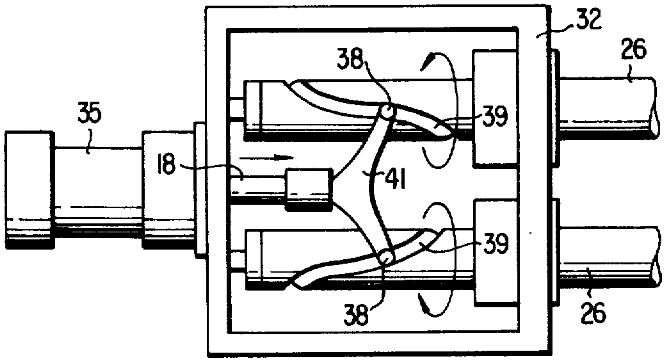
FIG. 11 is a bottom view of the cylindrical cam mechanism shown in FIG. 10.

A cylinder 30 is disposed above the cooling member 29 as a drive source for the clamps 27, and a rod 31 of cylinder 30 is pivotally connected to a head 32 within which is disposed a mechanism for closing and opening the clamps 27. Such a closing and opening mechanism for the clamps 27 is a mechanism of simple structure which can nevertheless accurately perform the required movements of the clamps 27, and such mechanisms may include a rack-and-pinion mechanism, as shown for example, in FIGS. 4 and 5, a slide rod or bar-crank mechanism, as shown in FIGS. 6 and 7, a gear mechanism as shown in FIGS. 8 and 9 or a cylindrical cam mechanism as shown in FIGS. 10 and 11.

Figure 5:
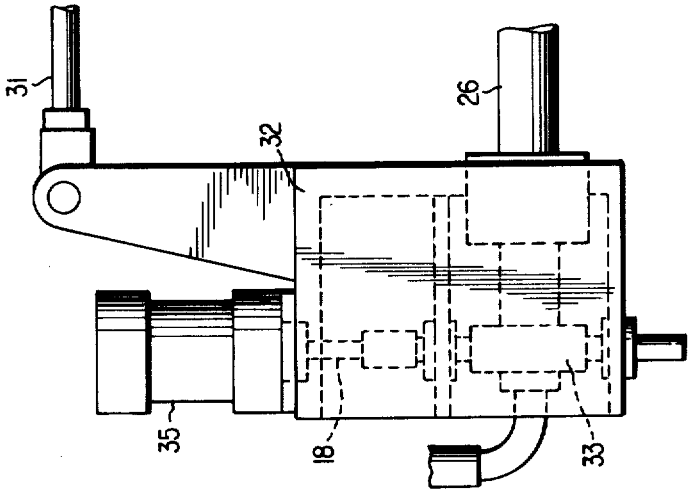
FIG. 5 is a side view of the opening-closing mechanism shown in FIG. 4.
Figure 4:
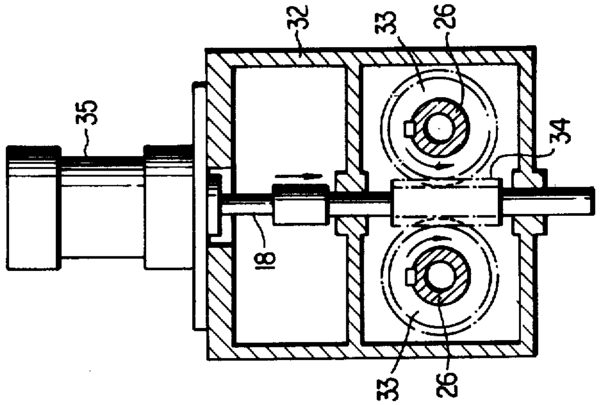
FIG. 4 is a front cross-sectional view of a rack-and-pinion mechanism for opening and closing the clamps of the present invention.

The rack-and-pinion opening and closing mechanism, as shown within FIGS. 4 and 5, includes pinions 33 fixed about the shaft ends of the running rods 26, and a rack 34 is interposed between the pinions 33 so as to be engaged therewith in a conventional manner. The rack 34 and pinions 33 are housed within the head 32, and a rod 18 of a cylinder 35 is connected to the rack 34, such that as a result of a downward movement of the cylinder rod 18, the two running rods 26 will be rotated by a prescribed amount in opposite directions and the clamps 27 fixed to the rods 26 will be opened so as to unclamp the premolded articles 6. Similarly, as a result of an upward movement of the cylinder rod 18, the operation is conducted in a manner reverse to the above-mentioned manner so as to clamp the premolded articles 6 within the clamps 27.

Figure 7:
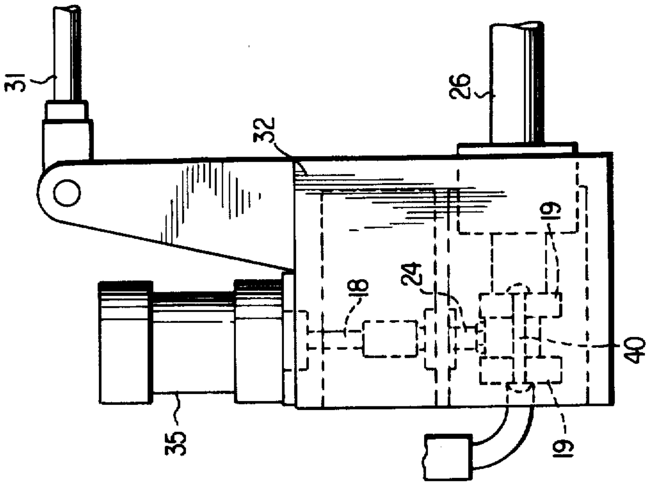
FIG. 7 is a side view of the opening-closing mechanism illustrated in FIG. 6.
Figure 6:
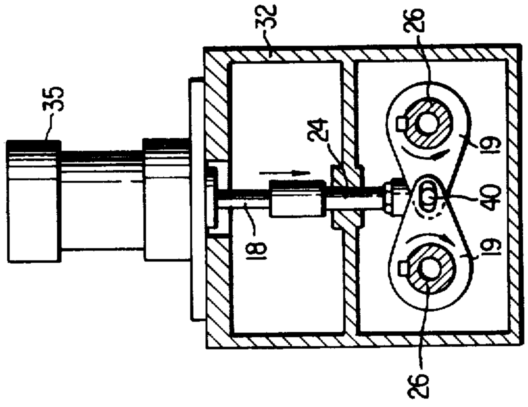
FIG. 6 is a front cross-sectional view of a slide bar-crank mechanism for opening and closing the clamps of the present invention.

The slide bar or rod-crank type opening and closing mechanism is shown within FIGS. 6 and 7 as including cranks 19 fixed to the shaft ends of the running rods 26, and these cranks 19 are connected by means of a pin and slot joint 40 to a slide bar or rod 24 which is in turn connected to the rod 18 of cylinder 35. As a result of a downward movement of the cylinder rod 18, the slide bar or rod 24 is also moved downwardly so as to rotate the cranks 19 and the two running rods 26 by a prescribed quantity and in opposite directions with respect to each other and thereby open the clamps 27 which are fixed to the running rods 26, whereby the premolded articles 6 are unclamped. As a result of an upward movement of the cylinder rod 18, the operation is conducted in a manner reverse to the above-mentioned manner so as to clamp the premolded articles 6.

Figure 8:
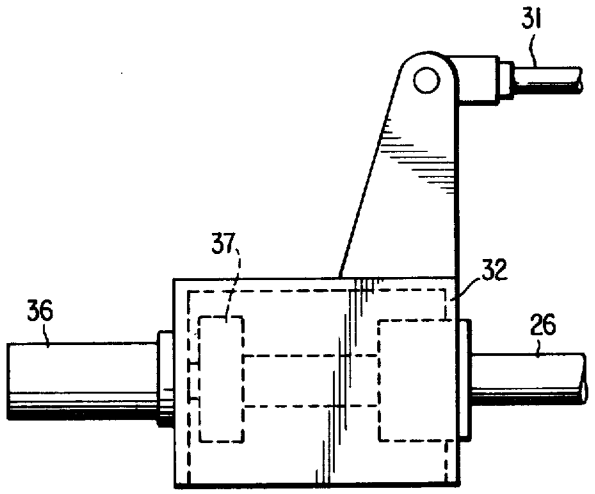
FIG. 8 is a side view of an actuator-gear mechanism for opening and closing the clamps of the present invention.
Figure 9:
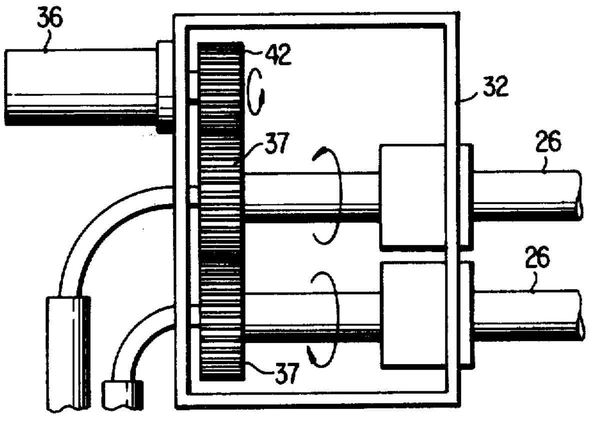
FIG. 9 is a bottom view of the opening-closing mechanism shown in FIG. 8.

Considering next the actuator-gear type clamp opening and closing mechanism shown within FIGS. 8 and 9, the mechanism includes gears 37 fixed to the shaft ends of the running rods 26, and a gear 42 which is engaged with one of the gears 37 and which is also connected to an actuator 36. Accordingly, when the actuator 36 is rotated so that the gears 37 and the running rods 26 are rotated by a prescribed quantity in directions opposite to each other, the clamps 27 fixed to the running rods 26 are opened so as to unclamp the premolded articles 6. Likewise, when the actuator 36 is rotated in the opposite direction, the premolded articles 6 will be clamped in a well known manner.

With reference now being made to the cylindrical cam type clamp opening and closing mechanism as shown within FIGS. 10 and 11, such mechanism is seen to include grooves 39 formed upon the shaft ends of the running rods 26, and rollers 38, attached to a substantially Y-shaped arm 41, fitted within the grooves 39. As the arm 41 is connected to the rod 18 of the cylinder 35, when the cylinder rod 18 is moved toward the right as seen in FIG. 11, arm 41 is also moved toward the right and the two running rods 26 are rotated by a prescribed quantity and in opposite directions with respect to each other so as to open the clamps 27 fixed to the running rods 26 whereby the premolded articles 6 will be unclamped. If the cylinder rod 18 is moved toward the left, the operation is conducted in a manner reverse to the above-mentioned mode of operation, and the premolded articles 6 will accordingly be clamped.

Stoppers 11 are mounted upon the shaft ends of the running rods 26 on the side thereof opposite that of the head 32, as shown within FIG. 2, and spacers 13, capable of moving toward or away from the running rods 26 in accordance with the operation of a cylinder 12, are mounted upon the running rods 26 laterally of the stopper 11. Spacers 13 need not be provided when premolded articles 6 are arranged in a single row, however, when the premolded articles 6 are arranged in three or more rows, two or more spacers 13 are required, or a stepwise spacer 13, having two or more steps, is required. These spacers 13 and cylinders 12 are disposed exteriorly of the furnace so that they are not adversely affected by the high temperature within the delivery zone.

When the clamps 27 are located at the position shown within FIG. 2, and the premolded articles 6 are unclamped at station 22, as a result of the leftward movement of the cylinder rod 31, the running rods 26, and the clamps 27 within their opened state, are moved, and when the stopper 11 comes into contact with the spacer 13, the clamps 27 will be stopped at the position b on station 21, although, if the spacer 13 has been retracted, the clamps 27 will be stopped at the position a on the station 21. Assuming that the clamps 27 have been stopped at the position b, as a result of the operation of the cylinder 35 or actuator 36, the clamps 27 will then be closed so as to clamp the premolded articles 6 by embracing the same from above. Subsequently, as a result of the rightward movement of the cylinder rod 31, the premolded articles 6 are then delivered to station 22 from station 21, the positioning of the station 22 being determined as a result of the contact between the head 32 with the furnace, and subsequent operation of the cylinder 35 or actuator 36 permits the premolded articles 6 to be unclamped at station 22.

As is apparent from the foregoing illustration, the reciprocating movement and the opening and closing operation of the clamps are performed by the independent cylinders 30 and 35 or actuator 36, respectively, and accordingly, if the timing of the operations of both the cylinders 30 and 35 or actuator 36 is appropriately set, premolded articles 6 to be heated are able to be successively delivered while the operations of clamping → delivery → unclamping → retreating → clamping are able to be continuously repeated.

In order to prevent damage to the premolded articles 6 which may readily be caused when the lower faces of the premolded articles 6 being delivered are in contact with the upper faces of the walls defining the delivery passage 25 and the stations 21 and 22, which are maintained at very high temperatures, the running rods 26 are inclined with respect to the horizontally disposed upper faces of such components by a prescribed angle d. By this arrangement, the aforenoted damage to the premolded articles 6, caused while they are being delivered, can be prevented.

In the embodiment shown within the drawings, delivery of the premolded articles 6 from station 22 to a final station 14 within furnace 4 is accomplished by means of an endless mesh belt 16 as best seen in FIG. 3. This belt may travel continuously at a constant rate of speed or alternatively may travel intermittently at a constant pitch or step. Between station 22 and final station 14 within furnace 4, that is, within the furnace chamber 23 of the cooling or soaking furnace 4, flame curtains 17 of a combustible gas or the like are formed at opposite ends of the furnace 4 in order to separate the reducing neutral gaseous atmosphere from the ambient air atmosphere.

As is apparent from the foregoing embodiments, according to the present invention, premolded articles 6 can be continuously and consistently heated so as to prepare the same for a subsequent forging step. However, as noted hereinabove, the present invention is not limited to the production of powder material forged products, and the device of the present invention is very effective for delivering articles to be heated from one furnace chamber to another furnace chamber in a compound furnace comprising two or more furnace chambers differing in heating conditions. Furthermore, as the articles to be delivered are not damaged during delivery, and the moving component parts of the delivery mechanism are cooled, even if the delivery is conducted under high temperature conditions, the delivery operation can be assuredly and continuously performed.

This is especially true in view of the fact that in delivering the articles to be heated from one furnace chamber to another furnace chamber, as only the indispensable component members, such as for example, the clamps are disposed within the high temperature delivery zone and the same are in fact cooled by specific means disposed within this high temperature delivery zone, while other members and mechanisms, such as for example, the clamp opening and closing mechanism and the running and driving mechanisms are disposed exteriorly of the furnace so as to eliminate adverse affects of the high temperatures thereon, the clamping, unclamping and reciprocating operations can be assuredly and promptly performed over a long period of time so as to improve and extend the service life of these mechanisms. Accordingly the present invention imparts a considerable contribution to the art.

Obviously, many modifications and variations of the present invention are possible in light of the above teachings. It is to be understood therefore that within the scope of the appended claims the present invention may be practiced otherwise than as specifically described herein.

What is claimed as new and desired to be secured by Letters Patent of the United States is:

1. A device for delivering articles to be heated within a compound furnace which includes at least two furnace chambers wherein the articles are to be delivered from one furnace chamber to another furnace chamber, comprising:

clamping means being capable of, reciprocating within a delivery passage defined within said compound furnace, and, clamping and unclamping said articles to be heated;

running rod means, upon which said clamping means are fixed, movable along and within said delivery passage and having one end thereof projecting outwardly through a wall of said compound furnace;

primary drive means disposed exteriorly of said compound furnace and operatively connected to said one end of said running rod means for driving said running rod means and said clamping means;

secondary linear drive means also disposed exteriorly of said compound furnace and operatively connected to said one end of said running rod means for performing said clamping and unclamping operations of said clamping means;

movement converting transmission means for converting the linear driving force of said secondary drive means to a rotary driving force for rotating said running rod means so as to actuate said clamping means in order to perform said clamping and unclamping operations; and clamp-positioning means for determining the stopping position of said clamping means within said passage.

2. A delivery device as set forth in claim 1 wherein said movement converting transmission means comprises:

a rack-and-pinion mechanism.

3. A delivery device as set forth in claim 1 wherein said movement converting transmission means comprises:

a slide bar-and-crank mechanism.

4. A delivery device as set forth in claim 1 wherein said movement converting transmission means comprises:

a gear mechanism.

5. A delivery device as set forth in claim 1 wherein said movement converting transmission means comprises:

a cylindrical cam mechanism.

6. A delivery device as set forth in claim 1 wherein: said primary drive means is a cylinder.

7. A delivery device as set forth in claim 1 wherein: said secondary drive means is a cylinder.

8. A delivery device as set forth in claim 1 wherein: said secondary drive means is an actuator.

9. A delivery device as set forth in claim 1 wherein: said running rod means is inclined with respect to the horizontal floor plane of said furnace and said delivery passage by a predetermined angle.

10. A delivery device as set forth in claim 1 wherein said clamp positioning means comprises:

a spacer operatively engageable or disengageable with said running rod means;

a spacer-driving cylinder for moving said spacer into engagement with, or for disengaging said spacer from, said running rod means; and a stopper, fixed to one end of said running rod means, for engaging said spacer.

11. A delivery device as set forth in claim 1 wherein: said delivery passage is provided with cooling means for cooling said passage with respect to the surrounding environment thereof; and said running rod means are hollow rods cooled by means of a cooling medium passing through the hollow portions thereof.

* * * * *